United States Patent [19]
Hedden

[11] 3,887,389
[45] June 3, 1975

[54] FIBER GLASS SIZING FOR USE IN TIRE CORD MANUFACTURING

[75] Inventor: Jerry C. Hedden, Shelby, N.C.

[73] Assignee: PPG Industries, Inc., Pittsburgh, Pa.

[22] Filed: Jan. 26, 1973

[21] Appl. No.: 326,740

[52] U.S. Cl............ 106/212; 106/213; 117/126 GQ
[51] Int. Cl...................... C08b 27/60; C08b 27/58
[58] Field of Search.............. 106/212, 287 SB, 213; 117/126 GQ

[56] References Cited
UNITED STATES PATENTS

| | | | |
|---|---|---|---|
| 3,227,192 | 1/1966 | Griffiths.......................... | 106/210 X |
| 3,265,516 | 8/1966 | Triplett et al...................... | 106/213 |
| 3,461,090 | 8/1969 | Haynes et al................... | 106/212 X |
| 3,658,571 | 4/1972 | Marzocchi..................... | 117/126 GB |

OTHER PUBLICATIONS
Union Carbide, Product Information Bulletin, "Silicones," PIB 15–12.

Primary Examiner—Theodore Morris
Attorney, Agent, or Firm—Robert DeMajistre; John E. Curley

[57] ABSTRACT

An improved textile forming size for glass fibers utilized in the preparation of rubber coated glass fiber tire cord is described in which a starch based forming size has incorporated therein a nonionic wetting agent, a silane coupling agent and a paraffinic or microcrystalline wax. The use of this forming size on glass fibers which are subsequently coated with elastomer for use as tire cord results in a tire cord having improved flex fatigue properties.

4 Claims, 1 Drawing Figure

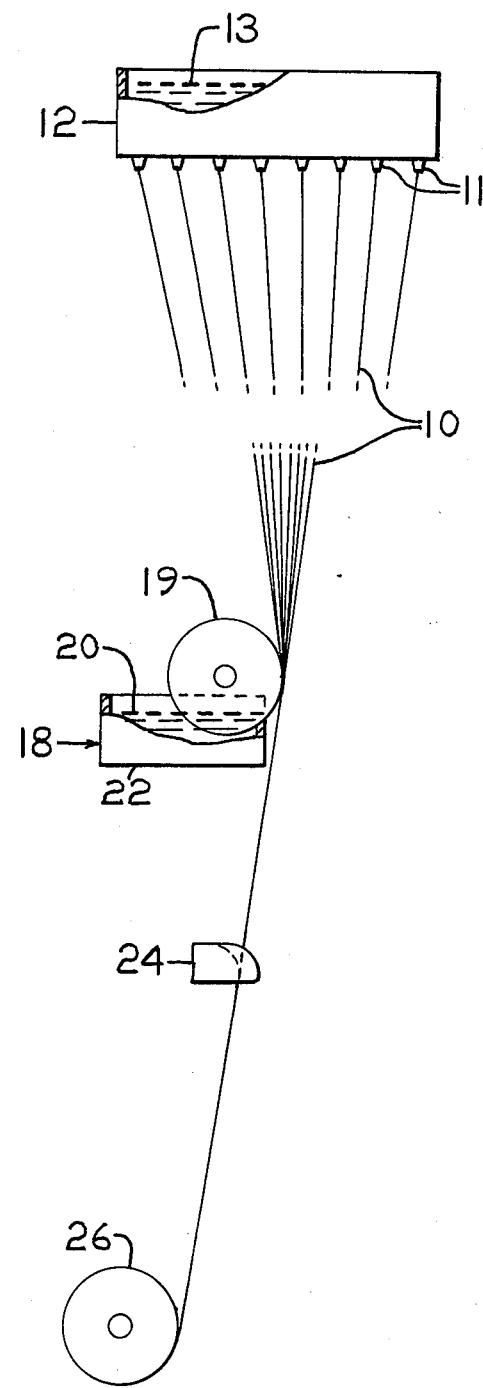

FIBER GLASS SIZING FOR USE IN TIRE CORD MANUFACTURING

BACKGROUND OF THE INVENTION

In the preparation of glass fibers for use as reinforcement in rubber, for example in automotive tires, it is conventional to size the glass fibers during forming and subsequently to coat the sized fibers with a coating composition containing a rubber adhesive and a latex coating. The rubber coated cords or strands of glass fibers are then dried and used to prepare fiber glass belts for incorporation into an automotive tire.

Many forming sizes have been disclosed in the art for use in preparing glass fibers into textile strand for various applications. One particularly effective textile forming size disclosed in the art is a starch weaving size disclosed in U.S. Pat. No. 3,227,192. This size has found particular utility as a textile forming size but is not a particularly suitable forming size for glass fibers used to form textile strands which are to be utilized in rubber reinforcement applications. An exemplary size for use in preparing glass fibers for subsequent coating with elastomeric material is described in U.S. Pat. No. 3,655,353.

THE PRESENT INVENTION

In accordance with the instant invention, applicant has improved on the textile forming size of U.S. Pat. No. 3,227,192 rendering that size compatible with rubber dip formulations conventionally employed to coat glass fiber strand utilized in rubber reinforcement applications such as in the formation of automotive tires. Thus, the rubber compatible forming size of the instant invention is starch based forming size which contains a selected silane coupling agent, a non-ionic wetting agent and preferably a paraffinic or microcrystalline wax. Glass fibers having this forming size applied thereto and coated with conventional rubber latex dip formulation for rubber reinforcement exhibit good flex fatigue properties, acceptable strip adhesion properties and strength in rubber.

The amylose starch mixture utilized in the instant invention has a high amylose starch fraction, i.e. one containing about 50 to 60 percent by weight of amylose with the greater portion of the remainder being amylopectin. The other fraction of the starch mixture is a water repellent low amylose starch fraction, i.e. one containing about 20 to 30 percent by weight amylose with the greater portion of the remainder being amylopectin. These starch fractions are employed in approximately equal proportions.

The basic starch components of the amylose containing starches employed in the starch mixture can be derived from any starch sources including corn, wheat, potato tapioca, waxy maize, sayo, rice, hybride starches and the like. Conveniently, however, the starch component having the high amylose content, i.e. 50 to 60 percent by weight, is derived either from potato starch or a hybrid corn starch having over 50 weight percent amylose, and the starch component having the low amylose content, i.e. 20 to 30 percent by weight, is derived from corn starch. The overall amylose content of the starch mixture can vary from 35 to 45 percent by weight based on the total starch content.

The low amylose content starch component is a water repellent starch which preferably contains from 25 to 27 percent amylose with the remainder being amylopectin. Instead of pure starch, the low amylose content component can and preferably does contain cross links. Thus, preferably the low amylose content component is a lightly crosslinked corn starch having an amylose content of from 25 to 27 percent by weight. The low amylose component constitutes from 45 to 55 percent by weight of the mixture (based on total starch content) and preferably about 50 percent by weight thereof.

The term "starch mixture" as used herein is intended to be descriptive of the fact that a plurality of different starches, each having a different amylose content are employed in the forming size composition and not to preclude the possibility of chemical interaction between the starch molecules of each of the starch components. In fact, some chemical bonding can be present between the molecules of both the high amylose starch and the low amylose starch, and such starch mixtures possessing intermolecular bonding between the starch components are considered to be included in the starch mixtures employed with this invention.

The individual starch components can be blended by mixing in the dry state by mechanical mixing and the mixture produced can then be added to water and cooked. The starches can also be added dry to a mixing vessel containing water, mixed and then cooked in the mixing vessel. The individual starch components can also be mixed with water separately, then admixed to form an aqueous slurry and then cooked. The individual starch components can also be mixed with water separately, cooked separately and then admixed.

An important consideration in preparing the starch based size compositions of the instant invention is the inclusion therein of considerable quantities of a non-ionic wetting agent. The use of this material in substantial concentration not only enhances the wetting of the fiber glass strands as size is applied thereto, but also complements the hygroscopic nature of the starch to thereby improve the ability of the size to absorb elastomeric dip during the subsequent coating operations. In general non-ionic wetting agents such as polyalkylene derivatives of esters, fatty acids, fatty alcohols, fatty amides and alkyl phenyl ethers may be employed with the alkyl phenyl ethers forming the preferred materials. Typically the non-ionic wetting agents are used in amounts ranging from 0.75 to 1.25 percent by weight based on the total weight of the aqueous size, preferably 0.8 to 1 percent by weight.

A microcrystalline wax is also employed in the preferred novel size of the instant invention and provides an improvement in flex fatigue properties of tire cord made using glass fibers sized with the instant invention. It is believed that incorporating a microcrystalline wax in the forming size provides a high concentration of wax in the proximity of the glass-silane-elastomer bond when the sized strand is coated with elastomer dip in the coating operations. The wax employed is a microcrystalline wax, having a melting point of about 100°C. or more, preferably above 135°C. The waxes are typically used in the size formulation of the instant invention as water dispersions containing 40 to 60 percent by weight wax therein, preferably 50 to 60 percent by weight. In the size formulation of the instant invention the wax content is typically between 0.5 to 3 percent by weight of the aqueous size solution and preferably 1 to 1.5 percent by weight in order to insure the desirable flex fatigue characteristics in the final coated cord product.

In lieu of microcrystalline waxes, paraffins may also be employed to impart desirable flex fatigue properties to glass fibers sized with the instant sizing and subsequently coated with elastomeric dip. These materials tend to have a lower melting point than the microcrystalline waxes, generally being in the range of 50°C. to about 80°C. Formulations employing these materials generally have the paraffin present in a range of from 0.5 to 3 percent by weight basis the weight of the size, preferably between 1 and 1.5 percent by weight.

Various silanes may be employed in the size formulation of the instant invention. In general hydrolyzable vinyl, alkyl, beta chloropropyl, phenyl, thio-alkyl, thio-alkaryl, amino-alkyl, methacrylato, epoxy and mercapto silanes, their hydrolysis products, polymers of the hydrolysis products and mixtures of any of these may be employed. Monoamino and diamino silanes have been found particularly suitable in the sizes involved in the instant invention. Thus, gamma-aminopropyl triethoxy silane, N-(trimethoxy silylpropyl) ethane diamine acrylamide and other similar mono and diamino silanes may be used. These silanes are employed typically in concentrations ranging between 0.4 to 1 percent by weight basis the aqueous size mixture and preferably between 0.5 to 0.7 percent by weight basis the aqueous size mixture.

The size of the instant invention contains other conventional size ingredients such as lubricants (vegetable oil), fungicides (tributyl-tin oxides), wetting agents and softening agents.

The invention is further illustrated by the following examples.

EXAMPLE I

A size formulation is prepared having the following constituents:

| Ingredients | Weight in grams |
|---|---|
| Amylon Starch - (fractionated natural potato starch with 55 percent by weight amylose) | 761 |
| National HFS Starch - (corn starch cross-linked with phosphorous oxychloride and having 27 percent by weight amylose.) | 761 |
| Pureco Oil (hydrogenated cottonseed oil) | 340 |
| Tween 81 (ethylene oxide derivative of a sorbitol ester. | 81 |
| Cation X (alkyl imidazoline reaction product of tetraethylene pentamine and stearic acid) | 152 |
| Carbowax 300 (polyethylene glycol having a molecular weight of about 300). | 180 |
| Biomet 66 (aqueous dispersion of bis(tri-n-butyl-tin)oxide) | 0.37 |
| Igepal CA 630 (acetyl phenoxy polyoxyethane ethanol) | 332 |
| Mobilcer Q (50% aqueous dispersion of microcrystalline wax) | 800 |
| C-600 (modified diamine silane) | 200 |
| Glacial acetic acid | 50 |
| Water (sufficient to provide final volume of size of | 37,854.34 cc |

Cold deionized water is added to a mixing tank in a volume of about 12,000 cc. Both starch components are then added to the tank and agitated, the Amylon Starch being added first and the National HFS Starch after the Amylon Starch has been added. Agitation is continued until substantially all lumps are dissolved. 12,000 cc. of additional water is then added to the tank and the resulting slurry is cooked at between 92°C. to 105°C. in a jet cooker for a sufficient period of time to thoroughly incorporate the starch into the aqueous system. The Carbowax 300 is then added to the slurry. The Cation X, previously mixed with 500 to 600 cc. of water maintained at 76°C. to 83°C. is then added to the starch slurry and agitated. The Tween 81 is added to the Pureco Oil and mixed therewith. To this mixture is added 250 to 1200 cc. of water at temperatures between 60°C. to 83°C. This mixture is added to the slurry and agitated therein. The slurry is then cooled to a temperature between 25°C. and 35°C. To the cooled homogenized slurry the Igepal CA 630 dissolved in 1,000 cc of water at 25°C. is added. Then the Mobilcer Q is diluted with 1,000 cc. of water and is added to the slurry. The C–600 is diluted with 1,200 cc. of water to which the acetic acid has been added and this mixture is then added to the slurry. Finally the Biomet 66 is added to complete the forming size. The size solution is then brought to a final volume of 37,854.34 cc. by the addition of the requisite amount of water.

In applying the forming size of the instant invention to glass fibers the application follows conventional sizing applications.

Thus, as shown in the drawing, molten glass 13 is contained in an electrically heated bushing 12. The bushing is maintained at temperature sufficient to maintain the glass 13 in a molten state. A plurality of glass fibers 10 are drawn from the bushing 12 through tips 11 and across the face of a roller applicator 19 contained in a housing 22. The housing has the forming size 20 of the instant invention maintained therein and supply line 18 can be used to add additional size to the tank 22 as required. The fibers 10 pass over a gathering shoe 24 after receiving size from the applicator 19 and are wound on a package contained on the surface of a winder 26. The cords or strands on the package associated with the winder 26 are then dried at temperature between 25°C. and 100°C. and after drying are subjected to a coating step.

In preparing finished cord the glass fibers sized with the above formulation are treated with a coating composition. The following example is illustrative of a coating composition with which the size of the invention is compatible.

Example II

| INGREDIENT Functional Description (Material) | RANGE Parts by Weight | PREFERRED Parts by Weight |
|---|---|---|
| Vehicle—Deionized Water | 89.7 – 139.7 | 111.7 |
| pH Control—Ammonium Hydroxide (28% aqueous solution) | 0.4 – 2.0 | 0.5 |
| Adhesive— | | |
| Resin—Novolak Resin (75% solids) | 10.7 – 26.7 | 16.4 |
| —Formaldehyde (37% aqueous solution) | 2.7 – 10.8 | 7.4 |
| Latex—Styrene-butadiene-vinylpyridine (15:70:15) (41% solids) | 146 – 244 | 244.0 |
| —Styrene-butadiene rubber (41% solids) | 0 – 97.5 | 0 |

On a solids basis the novolak comprises 11.6 to 12.2 percent by weight, the formaldehyde 1.4 to 2.5 percent by weight, and the combined latex 85 to 87 percent by weight, the styrenebutadiene-vinylpyridine being from 61 to 81 percent by weight, the styrene-butadiene rubber being 0 to 25 percent by weight. Solids content of the preferred coating dips shown above range from 27.6 percent to 32.2 percent by weight of the solutions, with the preferred composition 30 percent by weight solids.

In solutions having greater solids content, as for instance above 27 weight percent solids, the use of a novolak resin is preferred to use of a resorcinol-formaldehyde system. Less precipitation or "throwing out" occurs from large batches of coating solution when a novolak resin is used.

The mixture is prepared by adding the water to a premix tank followed by the addition of ammonium hydroxide while stirring and then adding the novolak to this mixture while stirring, continuing stirring until complete solution. The particular novolak used in the examples described was that marketed by Koppers Company under their tradename Penacolite R-2170. The styrene-butadiene-vinylpyridine is added to a batch tank and to it is added the styrene-butadiene rubber with stirring followed by continued stirring for about five minutes. The particular commercial latices used in the examples which follow were, unless otherwise indicated, a styrene-butadiene-vinylpyridine sold by General Tire & Rubber Company and designated Gentac and a styrene-butadiene rubber sold by General Tire & Rubber Company under the designation Genflo. The premix is then added to the batch tank with stirring which is continued for five minutes after addition. The formaldehyde is then added to the mixture and the mixture stirred for ten minutes. The coating mixture is allowed to age for at least about six hours before use.

A further size formulation in accordance with this invention was prepared as indicated in the following Example.

EXAMPLE III

The size formulation of Example I was used in the amounts indicated except that in lieu of the Mobilcer Q a paraffin was used. The paraffin used had a melting point of about 52°C. and 400 grams of the wax was used. The procedure of Example I was used to add the materials in the same sequence except that in adding the paraffin it was first melted. The molten paraffin was mixed with additional Tween 81 and this mixture was then subjected to homogenizing action in a high speed mixer, the Tween 81 being added at 15 parts per 100 parts of paraffin. While undergoing homogenization, 150 parts of water per 100 parts of paraffin are added to the Tween 81 - paraffin mixture. The resulting mixture was then added to the starch mixture in the same sequence as the microcrystalline wax.

The forming size prepared in this manner was then applied to glass fibers on an applicator in the same manner as the size of Example I.

EXAMPLE IV

The size of Example I was applied to fiber glass strands on equipment of the type shown in the drawing using applicator 19 to apply the size solution to the fiber drawn from the bushing tips 11 across the face of the applicator 19 which face was saturated with the size. The size is applied in an amount of about 1.3 percent by weight of the glass. The glass fibers employed were ECG-75's. (E indicates electrical glass, C indicates continuous forming, G indicates a filament diameter of 0.00036 and the "75" indicates 7,500 yards per pound of glass.) The fibers (400 in number) are gathered after sizing into a single strand using the gathering shoe 24 and wound on the forming package 26. After drying the sized strand for about 2 hours at 82.2°C., the strand is twisted onto a bobbin at one half turn per inch twist. Bobbins containing twisted and sized strands are then fed from a creel to a coater. The coater contains the dip formulation of Example II. The dip is applied by rollers contained in the dip tank and the strands in contacting the roller surfaces have dip applied thereto. The rollers are speed controlled in rotation by a suitable motor and are regulated to provide a dip pickup of 30 percent basis the weight of the glass. The strands are then combined into cords each cord containing five strands and the cords are dried in the manner described in U.S. Pat. No. 3,619,252.

EXAMPLE V

Fiber glass strands are sized as in Example IV using ECG-75's and the size of Example III. The sized strands containing 1.3 percent by weight of the size after drying are then coated with the dip of Example II to a weight percent of 30 percent and combined into cords, fine strands to each cord. The cords are then dried by the method described in U.S. Pat. No. 3,619,252.

EXAMPLE VI

To compare the fibers sized in accordance with this invention, a series of strands were prepared from ECG-75's using the size formulation of U.S. Pat. No. 3,655,353. The strands after sizing contain 0.8 percent by weight size thereon. After drying, the sized strands are coated with 30 percent by weight of the dip of Example II. The coated strands are then gathered into cords, each cord containing five strands and dried in accordance with the procedures of U.S. Pat. No. 3,619,252.

The cords prepared in Examples IV, V and VI were then subjected to the same physical tests to determine breaking strength in air and rubber, U-Pull, H-Pull and strip rating (adhesion tests) and flex fatigue properties. The results of these tests are shown below in Table I:

Table I

|  | Example IV | Example V | Example VI |
| --- | --- | --- | --- |
| Properties |  |  |  |
| U-Pull (lbs) | 25.8 | 26 | 18 |
| H-Pull (lbs) | 16.3 | 16 | 15 |
| Strip Rating | 3.5 | 4.0 | 2.0 |
| Breaking Strength (lbs) |  |  |  |
| In air | 63.0 | 65.5 | 63.9 |
| In rubber | 67.0 | 75.4 | 74.6 |
| Flex Fatigue (Kilocycles) | 749 | 807 | 308 |

As will be readily appreciated from the above Table I, the sizes of the instant invention provide cords which have unusually good flex fatigue properties rendering them extremely desirable for automative tire applications while still providing cords having acceptable strength and adhesion properties. Thus, in the strip adhesion test for example, a rating of 5 is considered perfect. A rating of 4 is considered to be excellent for cords used in automative tire products.

The cords sized with the formulation of the instant invention have also been found to be resistant to normal degradation found in conventional cords after storage for prolonged periods of time. In general, tire cords made of glass fibers tend to degrade in that they lose some of their breaking strength properties if stored for prolonged periods prior to incorporation into tire stock or for shorter periods at high temperature and high humidity.

Thus for example, a tire cord prepared from the size of Example VI and the dip of Example II and having an initial breaking strength in air of 66.5 pounds is found to have a breaking strength of 41.1 after 14 days storage at 49°C. and a 95 percent relative humidity. The cord made with the size of Example I and the dip of Example II and having an initial breaking strength of 63 pounds under the same time, temperature and humidity had a final breaking strength of 59.5. Similarly a cord made with the size of Example III and the dip of Example II and having an initial breaking strength of 65.7 and subjected to the same time, temperature and humidity has been found to have a final breaking strength of 49.1 pounds.

Thus, in addition to having excellent flex fatigue properties, the cords made from strands sized with the sizes of this invention have unusually good storage stability.

In the preferred embodiments of this invention, high amylose starch and low amylose starch mixtures have been used. It has been found that other modified starches can also be used such as the starches described in U.S. Pat. No. 3,664,855. This latter patent also discloses the use of paraffin in starch weaving sizes.

While the invention has been described with reference to certain specific embodiments, it is not intended to be limited thereby except insofar as appears in the claims. Thus, while paraffinic and microcrystalline waxes form the preferred embodiments of the instant invention, other waxes such as vegetable waxes, animal waxes and other synthetic waxes may be used provided they are employed in the quantities specified in the instant specification and claims. A plurality of these type waxes are enumerated in U.S. Pat. No. 3,664,855.

I claim:

1. A glass fiber forming size, useful for sizing glass fibers which reinforce elastomers to provide improved flex fatigue resistance, consisting essentially of: an aqueous starch mixture consisting essentially of; 45 to 55 percent by weight of a high amylose starch component having an amylose content of about 50 to about 60 percent by weight, and 45 to 55 percent by weight of a water-repellent low amylose starch component having crosslinks therein, having an amylose content of about 20 to 30 percent by weight; 0.5 to 3 percent by weight of a member of the group consisting of a paraffin wax and a microcrystalline wax; 0.4 to 1% by weight of a silane coupling agent; and about 0.75 to 1.25 percent by weight of a non-ionic wetting agent.

2. The forming size of claim 1 wherein said wax constituent is present from 1.0 to 1.5 percent by weight and said non-ionic wetting agent is present at about 0.8 to 1 percent by weight.

3. The size of claim 1 wherein the coupling agent is an amino silane.

4. The size of claim 2 wherein the silane coupling agent is an amino silane.

* * * * *